US005351973A

United States Patent [19]

Taniuchi et al.

[11] Patent Number: 5,351,973

[45] Date of Patent: Oct. 4, 1994

[54] RUBBER SEAL FOR WATERPROOF CONNECTOR

[75] Inventors: Osamu Taniuchi; Hajime Okada; Hajime Kawase, all of Yokkaichi, Japan

[73] Assignee: Sumitomo Wiring Systems, Ltd., Yokkaichi, Japan

[21] Appl. No.: 11,501

[22] Filed: Jan. 29, 1993

[30] Foreign Application Priority Data

Jan. 31, 1992 [JP] Japan .................................. 4-3362[U]

[51] Int. Cl.$^5$ ................................................ F16J 15/10

[52] U.S. Cl. .................................... 277/209; 277/210; 277/227; 277/DIG. 6; 439/274; 439/587

[58] Field of Search .................... 277/207 A, 208, 209, 277/210, 211, 227, DIG. 6; 439/271, 274, 275, 279, 283, 587–589, 750, 752

[56] References Cited

U.S. PATENT DOCUMENTS

| | | | |
|---|---|---|---|
| 3,879,044 | 4/1975 | Estes | 277/227 |
| 3,979,130 | 9/1976 | Cowie | 277/208 |
| 4,700,954 | 10/1987 | Fischer | 277/227 X |
| 4,895,533 | 1/1990 | Yagi et al. . | |
| 4,959,022 | 9/1990 | Neuroth | 439/589 |
| 4,973,266 | 11/1990 | Bullard | 439/589 |
| 4,973,268 | 11/1990 | Smith et al. | 439/589 X |
| 5,224,875 | 7/1993 | Watanabe et al. | 439/587 |

FOREIGN PATENT DOCUMENTS

| | | | |
|---|---|---|---|
| 245975 | 11/1987 | European Pat. Off. | 439/589 |
| 0424892 | 5/1991 | European Pat. Off. . | |
| 3904069 | 8/1989 | Fed. Rep. of Germany . | |
| 3916798 | 11/1990 | Fed. Rep. of Germany | 277/DIG. 6 |
| 2579244 | 9/1986 | France . | |
| 44241 | 1/1992 | Japan . | |
| 44242 | 1/1992 | Japan . | |

*Primary Examiner*—William A. Cuchlinski, Jr.
*Assistant Examiner*—Scott W. Cummings
*Attorney, Agent, or Firm*—Sandler Greenblum & Bernstein

[57] ABSTRACT

A cylindrically-shaped rubber seal is connected to a crimped wire terminal inserted to a connector member to effectively seal the terminal housing, or is connected to the fitting members of mating connectors to effectively seal the fitting members. The rubber seal is made of a rubber filled with reinforcing fibers oriented in the axial direction of the rubber seal to impart anisotropy to the strength of the rubber, so that the strength of the axial direction is greater than the strength in the vertical direction perpendicular to the axial direction and flexibility is maintained in the vertical directions. The rubber seal is also used as a connector seal to seal the mating members of mating male-female connectors. When the rubber seal is used in the chamber of female connector, the rubber seal can firmly receive the male connector without deformation in the insertion direction.

3 Claims, 2 Drawing Sheets

RUBBER SEAL FOR WATERPROOF CONNECTOR

BACKGROUND OF THE INVENTION

1. Field of the Invention

The present invention relates to a rubber seal for use in a waterproof connector that is characterized by using rubber having strength anisotropy, and more particularly, to a rubber seal attached to a terminal-crimped wire, and fitting and sealing the terminal housing by applying pressure and holding the terminal inserted in the connector terminal housing in the proper position, thus preventing water leakage into the connector.

2. Description of the Prior Art

To engage and hold a terminal housed in the terminal chamber of a connector, a flexible locking arm (lance) is conventionally provided on the terminal housing, and the locking arm engages the terminal to position the terminal in the correct position and prevents disconnection.

However, because the holding strength of the terminal is insufficient with engagement by this locking arm, and it is possible for the terminal to be left with the locking arm only half inserted, a terminal locking means that is a separate component and can be used to detect semi-insertion of the terminal, and is used to double-lock the terminal and connector is often used.

In FIGS. 5A and 5B, a conventional waterproof connector is shown. A rubber seal 3 is provided on the end of the wire 2 to which the terminal 1 is crimped, the wire barrel 1*a* of the terminal 1 is crimped to the core wire 4 of the wire 2 extending from the rubber seal 3, the insulation barrel 1*b* is crimped where the rubber seal 3 is attached, and in this state, the female connector 5 and male connector 6 are each inserted to their respective terminal housings 7; the back end of the rubber seal 3 is then pressed by a pusher 8, and the terminal 1 engages with the locking arm 9 provided on the terminal housing 7.

As described above, the half-inserted state of terminal 1 cannot be completely prevented when a rubber seal 3 is used even when pressed by the pusher 8 because the rubber seal 3 is flexible. As a result, a construction in which a plastic component is integrally molded with the rubber seal and the plastic component is pressed by another part from the back is used. However, integrally molding rubber and plastic is extremely difficult, and causes problems such as increasing the number of molding cycles and increasing costs.

SUMMARY OF THE INVENTION

The present invention has been developed with a view to substantially solving the above described disadvantages and has for its essential object to provide an improved rubber seal for use in a waterproof connector.

In order to achieve the aforementioned objective, a rubber seal is made of a rubber filled with reinforcing fibers and placed between a male connector and a female connector having a chamber for receiving said male connector therein for securing a tight connection therebetween. The rubber seal comprises an elongated tubular body having first and second openings at opposite ends thereof, and having an inner tubular space extending between said first and second openings adapted to receive said female connector therein; said elongated tubular body having a first portion with an increased outersurface diameter and a second portion with a decreased outersurface diameter, said first portion having a diameter greater than an inner diameter of said female connector; and said elongated tubular body having a third portion with a decreased innersurface diameter and a fourth portion with an increased innersurface diameter, said third portion having a diameter smaller than an outer diameter of said male connector, said reinforcing fibers being oriented in an axial direction of said rubber seal to impart anisotropy to the strength of said rubber seal such that the strength in said axial direction is greater than the strength in a radial direction, and elasticity is maintained in said radial direction.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
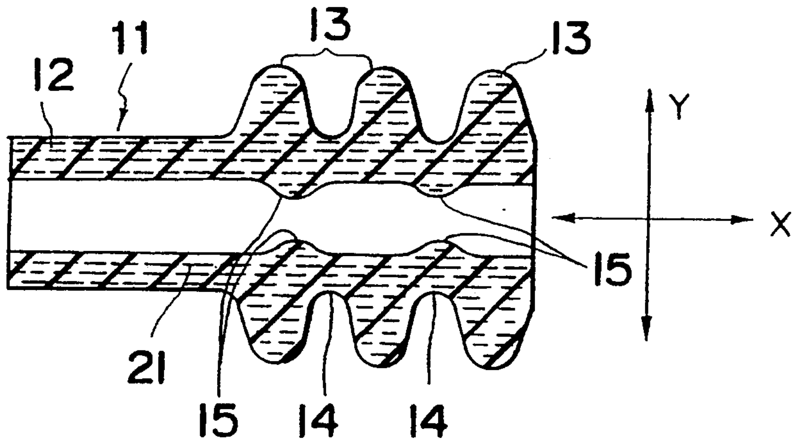
FIG. 1 is a cross-sectional view showing the rubber seal according to a first preferred embodiment of the present invention.

Referring to FIG. 1, a rubber seal for use in the waterproof conectors according to a first embodiment of the present invention is shown. The rubber seal 11 is basically cylindrical in shape and comprises at one end a small outside diameter terminal attaching member 12 having a constant inside diameter and outside diameter, and, from the middle to the other end, plural consecutive terminal housing contact members 13 with a large outside diameter separated by gap members 14 having a small diameter, and projections 15 spaced in the axial direction on the inside surface. The terminal housing contact members 13, gap member 14, and projections 15 are configured to have curved lines in cross section.

The rubber seal 11 is formed by an reinforcing rubber filled with glass fiber or another reinforcing fiber 21 of a specific length. The reinforcing fiber 21 is oriented with the length along the axial direction X of the cylinder. The strength of the axial direction X is increased compared to the direction Y perpendicular to the axis X and other intersecting directions, because the reinforcing fiber 21 is oriented as described above in the axial direction X. Then, the flexibility in the X direction is extremely low compared to the Y direction. In other words, there is no compression when pressure is applied at one end in the X direction, and this pressure can be transferred to the other end. On the other hand, direction Y perpendicular to the axial direction X has low strength, but maintains sufficient flexibility. A further detail of such a reinforcing rubber is disclosed, for example, in Japanese Patent Laid-open publication No.

4-4241 and No. 4-4242, which are incorporated herein by reference.

Figure 2:
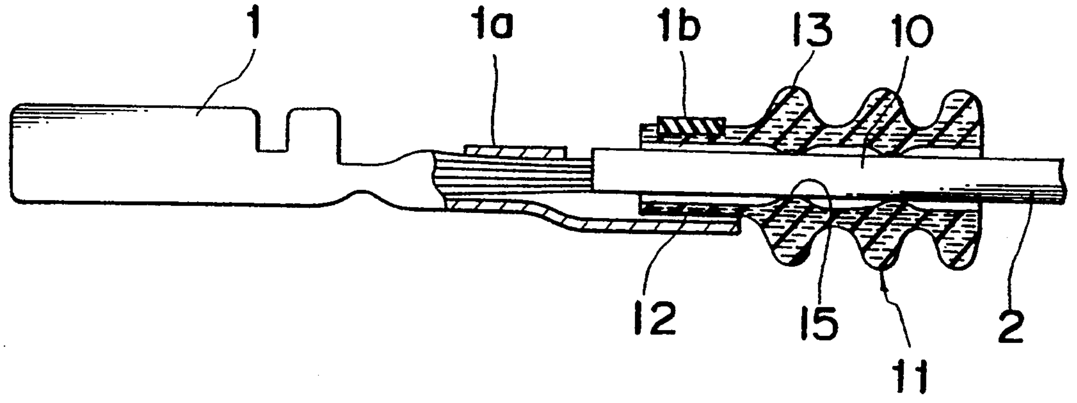
FIG. 2 is a cross-sectional view shown the rubber seal of FIG. 1 is attached to the wire crimped to a terminal is shown.

Referring to FIG. 2, the rubber seal attached to a terminal-crimped wire 2 is shown. The rubber seal 11 fits over the end part of the insulation coating 10 of the wire 2, positioning the terminal attaching member 12 to the exposed side of the core wires 4. At this time, the outside circumference surface of the insulation coating 10 is pressed in particular by the projections 15 provided on the inside circumference surface of the rubber seal 11.

The terminal 1 is crimped to the wire 2 to which is attached the rubber seal 11. The wire barrel 1*a* of the terminal 1 is crimped to the core wires 4, and the insulation barrel 1*b* is crimped to the outside circumference surface of the terminal attaching member 12 of the rubber seal 11.

Figure 3:
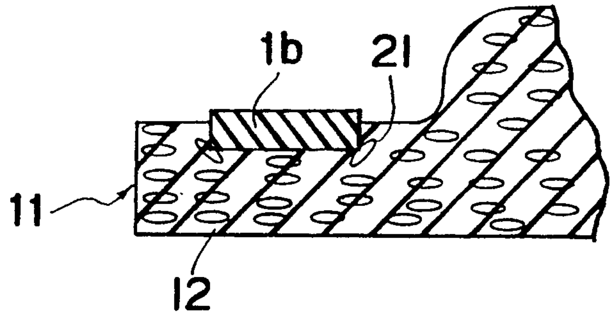
FIG. 3 is a cross-sectional view showing a part of FIG. 2 at a large scale.

Referring to FIG. 3, the end portion of the terminal attaching member 12 is shown at a large scale. The insulation barrel 1*b* bites into the terminal attaching member 12, both ends of the insulation barrel 1*b* become wrapped by the reinforcing fibers 21, and the rubber seal 11 cannot separate from the terminal 1.

Hereinafter, the insertion operation of terminal 1 with the rubber seal 11 into the terminal connectors is described with reference to FIGS. 5A and 5B, because the terminal connectors used are the same as those shown in FIGS. 5A and 5B. During the insertion to the chamber of terminal housing 7 of the female connector 5 shown in FIG. 5A, the rubber seal 11 can be easily inserted even if the large-diameter terminal housing contact members 13 contact the inside surface of the terminal housing 7 because the strength is high and the flexibility is low in the axial direction X, i.e., the insertion direction. Similarly, the terminal 1 with the rubber seal 11 can be inserted into the terminal housing 7 of the male connector 6 shown in FIG. 5B.

Figure 5A:
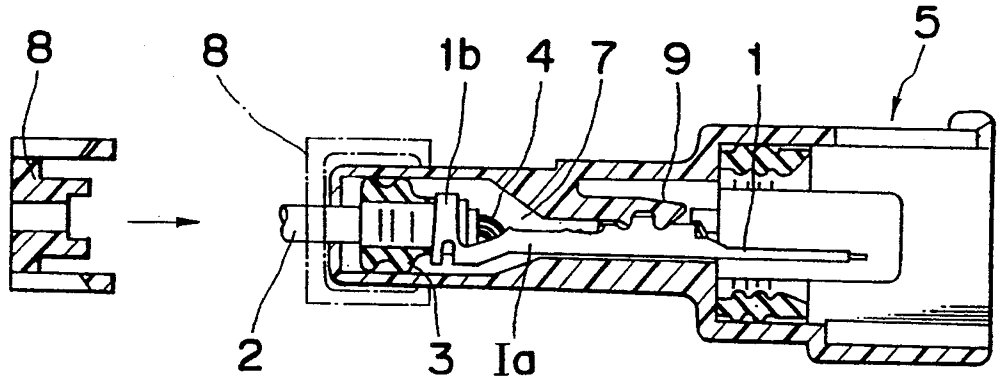
Fig. 5A PRIOR ART
FIGS. 5A and 5B are cross-sectional views showing a conventional waterproof connector.
Figure 5B:
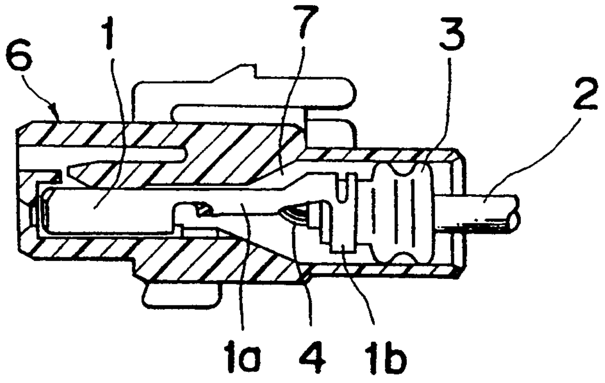
Fig. 5B PRIOR ART

After insertion, as shown in FIG. 5A, the pusher 8 is pressed from the back end of the rubber seal 11 and attached. By pressing the pusher 8, the rubber seal 11 is pressed in the axial direction, and because the strength is high and compression is low in the axial direction X, the pressure of the other part 8 is transferred through the rubber seal 11 to apply an approximately equal pressure on the terminal 1. The terminal 1 is thus pressed, the engaging member can engage the locking arm 9 formed in the terminal housing, and a half-inserted state can be completely prevented.

Furthermore, the terminal housing contact members 13 of the rubber seal 11 inserted to the terminal housing contact the inside surface of the terminal housing in direction Y perpendicular to the axial direction, and the terminal housing can be completely sealed because there is sufficient flexibility in this Y direction.

Figure 4:
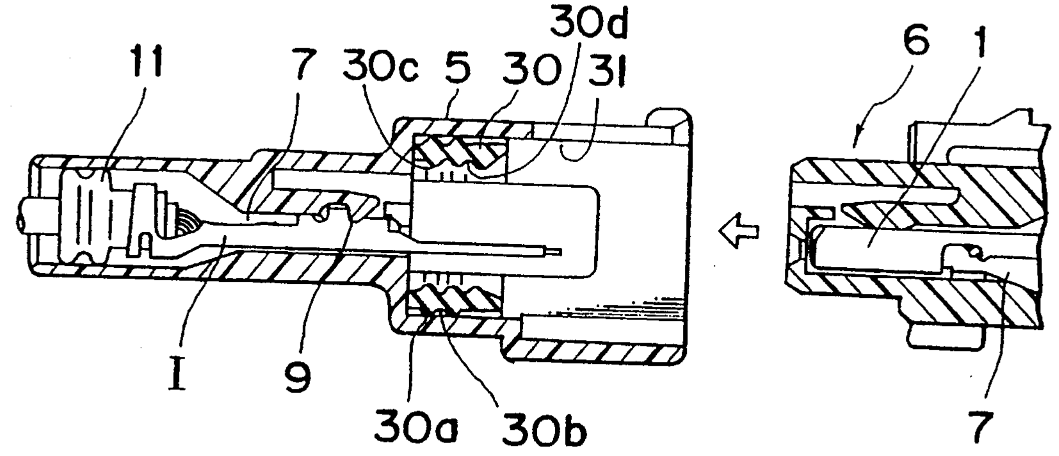
FIG. 4 is a cross-sectional view showing a rubber seal according to a second embodiment of the present invention.

Referring to FIG. 4, a rubber seal according to a second embodiment of the present invention, attached to the female connecter as a connector seal, is shown. The rubber seal 30 is formed in a cylindrical shape similar to the rubber seal 11 by a rubber seal filled with oriented reinforcing fibers, in which the terminal attaching member 12 is removed. The rubber seal 30 comprises plural outer contact members 30*a* having a diameter large enough to pressedly contact with the inner surface of the female connector 5 when the rubber seal 30 is attached, and outer gap members members 30*b* formed on the outside surface. The rubber seal 30 further comprises plural inner contact members 30*c* having a diameter smaller than the outside diameter of the male connector 6 and inner gap members 30*d*.

The male connector 6 is inserted into the inner space of the rubber seal 30, defined by the inner contract member 30*c*. Since the reinforcing fiber 21 is also oriented in the axial direction in the rubber seal 30, there is little deformation in the axial direction. Therefore, the mating members of the male-female connector can be reliably sealed when the male connector 6 is fit inside of the rubber connector 30, such that the inner contact members 30*c* are tightly pressed against the outer surface of the male connector 6.

As will be known from the above description, the rubber seal according to the present invention has strength anisotropy, whereby the internal strength in the axial direction against which pressure acts is greater than the external strength applied from the outside. When the rubber seals 11 or 30 is attached to a terminal-crimped wire, pressure applied to the other part is transferred to the terminal, and the terminal can be reliably engaged in the normal position. Furthermore, deformation during fitting with the other connector can eliminated when used as a connector seal.

Furthermore, because it is no longer necessary to integrally mold the plastic component to the rubber seal as with the prior art, molding is simple and the invention can be provided at low cost.

With these rubber seal, the internal strength in the axial direction can be made greater than the external strength in the other intersecting directions and flexibility in the axial direction can be made very small because the filler fibers are aligned in the axial direction. Thus, when the rubber seal is attached to the terminal-crimped wire, the back end of the rubber seal is pressed by the pusher. This pressing force is transferred to the terminal through the rubber seal, the terminal can be engaged with the locking arm provided inside the terminal chamber, and a semi-inserted state can be reliably prevented. In addition, disconnection can be prevented because the holding strength of the terminal engaged with the locking arm is high. Moreover, insertion of the terminal-crimped wire with the attached rubber seal to the terminal chamber is also easy because there is no flexibility in the axial direction.

On the other hand, the outside circumference surface of the rubber seal contacts the inside surface of the terminal housing and provides a sufficient sealing capacity because flexibility equivalent to a conventional rubber seal is maintained in the directions intersecting the axial direction.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A rubber seal made of rubber and filled with reinforcing fibers being placed between a male connector and a female connector, said female connector having a chamber for receiving said male connector therein for securing a tight connection therebetween, said rubber seal comprising:

an elongated tubular body having first and second openings at opposite ends thereof, and having an inner tubular space extending between said first and second openings, said inner tubular space being adapted to receive said female connector therein;

said elongated tubular body having a first portion with an increased outersurface diameter and a second portion with a decreased outersurface diameter, said first portion having a diameter greater than an inner diameter of said female connector;

said elongated tubular body having a third portion with a decreased innersurface diameter and a fourth portion with an increased innersurface diameter, said third portion having a diameter smaller than an outer diameter of said male connector, said reinforcing fibers being oriented in an axial direction of said rubber seal to impart anisotropy to the strength of said rubber seal, wherein the strength in said axial direction is greater than the strength in a radial direction, and elasticity is maintained in said radial direction.

2. A rubber seal is claimed in claim 1, wherein said reinforcing fiber comprises a glass fiber.

3. A rubber seal made of rubber and filled with reinforcing fibers for setting a wire being crimped to a terminal in a terminal chamber of a connector to secure a tight connection therewith, said rubber seal comprising:

an elongated tubular body having first and second openings at opposite ends thereof, and having an inner tubular space extending between said first and second openings, said inner tubular space being adapted to receive said wire therein;

said elongated tubular body having a first portion with an increased outersurface diameter and a second portion with a decreased outersurface diameter, said first portion having a diameter greater than an inner diameter of said connector;

said elongated tubular body having a third portion with a decreased innersurface diameter and a fourth portion with an increased innersurface diameter, said third portion having a diameter smaller than an outer diameter of said wire; and said elongated tubular body having a fifth portion with an outer plain surface adapted to engage said terminal, and reinforcing fibers being oriented in an axial direction of said rubber seal to impart anisotropy to the strength of said rubber search seal, wherein the strength in said axial direction is greater than the strength in a radial direction, and elasticity is maintained in said radial direction.

* * * * *